(12) United States Patent
Trumbull et al.

(10) Patent No.: US 9,338,176 B2
(45) Date of Patent: May 10, 2016

(54) SYSTEMS AND METHODS OF IDENTITY AND ACCESS MANAGEMENT

(75) Inventors: Dean A. Trumbull, Bartonville, TX (US); Michael Roy Stute, Plano, TX (US)

(73) Assignee: Global DataGuard, Inc., Dallas, TX (US)

(*) Notice: Subject to any disclaimer, the term of this patent is extended or adjusted under 35 U.S.C. 154(b) by 1300 days.

(21) Appl. No.: 12/350,192

(22) Filed: Jan. 7, 2009

(65) Prior Publication Data

US 2009/0177675 A1 Jul. 9, 2009

Related U.S. Application Data

(60) Provisional application No. 61/019,535, filed on Jan. 7, 2008.

(51) Int. Cl.
  *H04L 29/06* (2006.01)
  *H04L 12/58* (2006.01)
  *G06F 21/55* (2013.01)

(52) U.S. Cl.
  CPC .......... *H04L 63/1416* (2013.01); *G06F 21/552* (2013.01); *H04L 63/102* (2013.01); *G06F 21/55* (2013.01); *H04L 12/585* (2013.01); *H04L 63/08* (2013.01); *H04L 63/104* (2013.01); *H04L 63/1441* (2013.01); *H04L 63/20* (2013.01)

(58) Field of Classification Search
  CPC ....... H04L 63/20; H04L 63/08; H04L 12/585; H04L 63/1441; G06F 21/55
  USPC .......................... 713/100, 188; 726/3, 22–25
  See application file for complete search history.

(56) References Cited

U.S. PATENT DOCUMENTS

| | | | |
|---|---|---|---|
| 7,913,303 B1* | 3/2011 | Rouland et al. | 726/23 |
| 2003/0051026 A1* | 3/2003 | Carter et al. | 709/224 |
| 2003/0154399 A1* | 8/2003 | Zuk et al. | 713/201 |
| 2005/0108578 A1* | 5/2005 | Tajalli et al. | 713/201 |
| 2006/0053491 A1* | 3/2006 | Khuti et al. | 726/23 |
| 2006/0230039 A1* | 10/2006 | Shull et al. | 707/6 |
| 2006/0242701 A1* | 10/2006 | Black et al. | 726/22 |
| 2008/0010225 A1* | 1/2008 | Gonsalves et al. | 706/11 |

* cited by examiner

*Primary Examiner* — Carl Colin
*Assistant Examiner* — Gary Lavelle
(74) *Attorney, Agent, or Firm* — McGuireWoods, LLP

(57) ABSTRACT

The present disclosure generally provides systems and methods of providing identification and access management. The system could include a network security zone having access rules for a network resource object associated with the network. The system could also include a module to collect information related to an attempt to access the network resource object and to generate an alert if the collected information fails to meet certain requirements related to the access rules. The module could change the access rules to prevent possible future unauthorized access attempts based on the collected information.

17 Claims, 4 Drawing Sheets

SYSTEMS AND METHODS OF IDENTITY AND ACCESS MANAGEMENT

CROSS REFERENCE TO RELATED APPLICATION

This application claims benefit under 35 U.S.C. §119(e) of U.S. Provisional Patent Application No. 61/019,535 filed on Jan. 7, 2008 in the United States Patent and Trademark Office entitled "Identity and Access Management System and Method." The entire disclosure of U.S. Provisional Patent Application No. 61/019,535 is incorporated by reference as if fully disclosed herein.

TECHNICAL FIELD

The present disclosure generally relates to information systems and, in particular, to systems and methods of network security.

BACKGROUND

Companies typically need to manage and provide secure access to certain information and enterprise applications across multiple systems. Most companies also need to deliver on-line services to employees, customers, vendors, and suppliers without compromising security.

Conventional methods typically require the use of login names, login passwords, and secondary codes. Such methods provide only a basic level of security and may not be relied upon exclusively to ensure against security breaches. Still other conventional methods use digital certificates and trusted third party certificate authorities. Such certificates could, however, be copied and even stolen remotely. Moreover, third party verification groups may not have a vested interest in protecting the networks relying upon them.

Other conventional methods typically use Internet Protocol (IP) addresses and geo-location services that rely on IP addresses to verify the identity of end-users. Still other conventional methods cross reference information related to current physical locations with known user related information to verify user identities. Such methods could be subject to spoofing, a technique used by network intruders to make it appear as if they are connecting from a trusted or different IP address.

There is, however, a need for systems and methods of providing identification and access management.

SUMMARY

Embodiments of the present disclosure generally provide systems and methods of identification and access management.

In one embodiment, the present disclosure could generally provide a system of managing access to a network. The system could include a network security zone having access rules for a network resource object associated with the network. The system could also include a module to collect information related to an attempt to access the network resource object and to generate an alert if the collected information fails to meet certain requirements related to the access rules. The module could change the access rules to prevent possible future unauthorized access attempts based on the collected information.

In one embodiment, the present disclosure could generally provide a method of managing access to a network. The method could include collecting information related to an attempted access to a network resource object associated with the network. The method could also include comparing the collected information with one or more access rules defined in a network security zone. The method could further include allowing access to the network resource object if the collected information meets certain criteria set by the access rules. The method could still further include generating an alert if the collected information fails to meet the certain criteria set by the access rules. The method could further include predicting a future unauthorized access attempt based on the collected information.

In one embodiment, the present disclosure could generally provide an identity and access management system. The system could include a network security zone having an access rule related to a network resource object. The system could also include a first circuit to generate an alert if information related to an attempted access to the network resource object fails to meet certain criteria associated with the access rules. The system could further include a second circuit to conduct an analysis of behavioral patterns related to the attempted access and to change the access rule to prevent a future unauthorized access attempt based on the analysis.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides systems and methods of providing identification and access management. In one embodiment, the present disclosure provides systems and methods of implementing network security based on behavioral network analysis and correlation.

Figure 1:
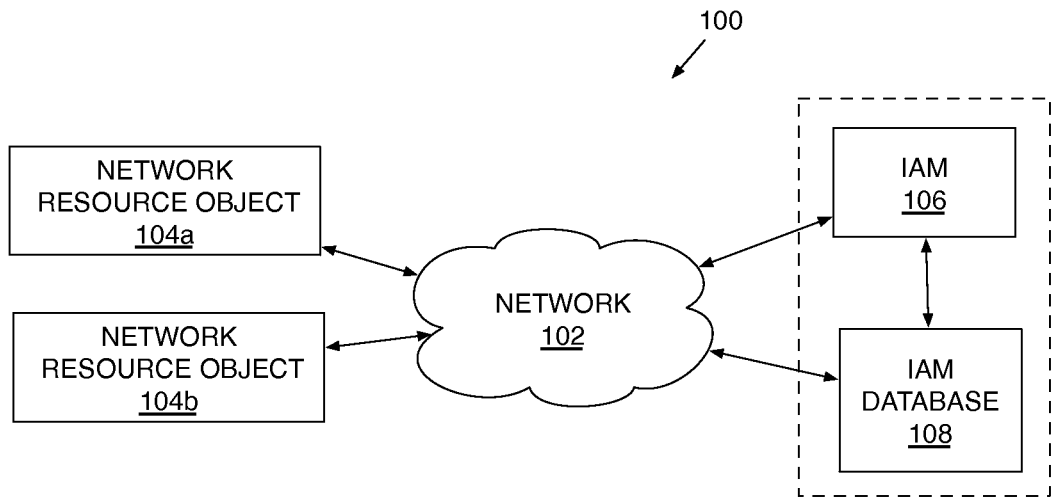
FIG. 1 is an exemplary illustration of a network having an identity and access management (IAM) system according to one embodiment of the present disclosure.

FIG. 1 is an exemplary illustration of an enterprise system 100 according to one embodiment of the present disclosure. It should be understood that enterprise system 100 shown in FIG. 1 is for illustrative purposes only and that any other suitable system or subsystem could be used in conjunction with or in lieu of enterprise system 100 according to one embodiment of the present disclosure.

Enterprise system 100 could include network 102 and two or more network devices or network resource objects 104a and 104b (collectively referred to herein as resource objects 104). Network 102 could include any suitable network of computers, terminals, databases, applications, programs, software, secured areas, networked devices, other suitable devices or modules, or any combination thereof configured to communicate by one or more wire-line or wireless connections.

Similarly, each of network resource objects 104 could be configured to communicate with network 102 by one or more wire-line or wireless connections. Although FIG. 1 illustrates only two network resource objects 104a and 104b, it should be understood that any suitable number, configuration, or type of network resource objects 104 could also be used in accordance with the present disclosure.

Network resource objects 104 could include a server, user terminal, stand-alone unit, network device, database, module, application, software, scanner, printer, modem, facsimile machine, backup database, telephone system, router, Internet portal, Intranet portal, remote access portal, other suitable device, area, or database, or any combination thereof. Network resource objects 104 could also be used to group certain devices by departments, management levels, users, employees, security clearances, priority levels, other suitable groups, or any combination thereof. For example, users belonging to a particular department, management group, security clearance group, or specialty within an enterprise could be grouped into one of "network resource objects" 104.

Enterprise system 100 could also include identity and access management (IAM) system 106 and IAM database (DB) 108. IAM system 106 and IAM database 108 are preferably configured to communicate with the other by one or more wire-line or wireless connections. IAM system 106 could use IAM database 108 to aid in storing, parsing, categorizing, or other suitable function by using, for example, access rules, restriction requirements, management information, collected data, correlated data, predication data, behavioral information, other suitable information, or any combination thereof.

In addition, IAM system 106 could dynamically restrict authorized users and access attempts if such users or access attempts occur when IAM system 106 detects vulnerabilities or behaviors that are deemed hostile. Accordingly, IAM system 106 and its use of tracking and monitoring behaviors over a long period of time could provide an added measure of security to any pre-defined policies followed by IAM system 106.

Although FIG. 1 illustrates only one IAM system 106 and IAM database 108, it should be understood that any number of IAM systems 106 or IAM databases 108 could be used in accordance with the present disclosure. It should be understood that IAM system 106 and IAM database 108 shown in FIG. 1 is for illustrative purposes only and that any other suitable system or subsystem could be used in conjunction with or in lieu of IAM system 106 or IAM database 108 in accordance with the present disclosure.

Furthermore, although IAM system 106 is generally illustrated in FIG. 1 as a stand-alone unit or system, IAM system 106 could be included as part of any one of resource objects 104, network 102, computer, terminal, software application, other suitable circuit or module, or any combination thereof. Furthermore, IAM database 108 could be included as part of IAM system 106, one of resource objects 104, network 102, other suitable circuit or module, or any combination thereof.

IAM system 106 could be configured to, for example, to manage or monitor network 102 for access attempts and security breaches, to selectively manage and provide access to certain areas of network 102 or network resource objects 104, to identify of users desiring access to network 102 or network resource objects 104, and to correlate behavioral patterns to predict future security breaches.

IAM system 106 could generally be any application, software, module, unit, stand-alone unit, network device, or circuit that is configured to identify, assess, monitor, and provide access to user of a network or network device to the network or other network device, while IAM database 108 could generally be any suitable electronic filing system, structured collections of records, memory circuits, any other suitable circuits or modules used to store information, or any combination thereof.

In one embodiment, IAM system 106 generally allows a network administrator, other enterprise official, or authorized user to create customized network security zones to initialize, set-up, modify, control, define, or otherwise create customized rules or definitions for each device on the network. These rules provide an initial static policy from which any network behavioral analysis could be applied. In addition, IAM system 106 could dynamically augment such rules with information related to the detected behaviors. In one example, IAM system 106 could use collected information to determine, predict, or otherwise prepare for any increasing hostility and subsequently deny authorized access attempts that would otherwise comply with the defined statically defined policy or policies.

In one example, IAM system 106 could be used to restrict or generally assign a particular network device, user, or groups of users to a particular level of security (e.g., "level two" security for certain databases, "level three" security for certain enterprise applications, and "level four" security for certain network devices). In one embodiment, IAM system 106 could be used to define "level two" security for certain databases by creating rules for a specific network device or user to provide unrestricted access to certain databases, but restricted or no access to others. Similarly, "level three" security could be defined for certain enterprise applications and include providing unrestricted access to certain applications, but restricted or no access to others. Likewise, "level four" security for certain network devices could include defining unrestricted access to certain network devices, but restricted or no access to others.

It should be understood, however, that all four of the example security levels described above could be augmented by the network behavioral analysis to provide, for example, a "fifth" level of security that dynamically restricts access to authorized users when increasing hostility is detected. IAM system 106 could, in some cases, also restrict access to authorized users in unrelated areas of the network. Accordingly, IAM system 106 could restrict access to an authorized user when IAM system 106 detects, for example, a virus or other behaviors that could be deemed hostile.

In one embodiment, IAM system 106 generally monitors a network and detects when a user attempts to access network 100. IAM system 106 could collect information from the user's network device and store such information in IAM database 108. This information could include information related to the network, the user, the user's department, prior level, network status, user status, or other suitable data associated with the user, the user of network device, the network device attempting to access the network, the activity of a user or network device, or any combination thereof.

In one embodiment, IAM system 106 could record information from the unauthorized user and use the information to create a database of security breaches. Such databases could be used to dynamically manage, alert others, correlate, compile, or analyze such breaches and possibly determine the sources, attack patterns, behavioral patterns, future security breaches, other suitable information, or any combination thereof.

An advantage of one embodiment of the present disclosure includes providing network security systems and methods based on behavioral network analysis and correlation without the use of host agents or necessitating the deployment of obtrusive centralized authentication appliances. In addition, although the foregoing generally describes employing user-defined rules for detecting unauthorized network activity, embodiments of the present disclosure could be employed to detect network activity or devices that have not been previously defined within a network security zone or by comparing the pattern of information collected over time.

Embodiments of the present disclosure could also be used to generate alerts when information is collected that falls outside of that pattern. For example, in one embodiment, IAM system 106 could implement any suitable alert system. For example, in one embodiment, IAM system 106 could include alerting an administrator of system 100 by email, text message, alarm, system notifier, pop-up alert, alert record, light or sound alert, any suitable mechanism to relay alert information, or any combination thereof. It should be understood that each alert could be defined and given a specific alert or priority level depending on the severity, frequency, predefined feature, satisfaction of a rule, source IP address, destination IP address, or other characteristic of the alert or circumstances at hand.

In one embodiment, IAM system 106 could generate a record, report, log, custom output, or other suitable correlated information for general network activity, security breaches, alarms, or other network activity related information. Such reports could be recorded, correlated, analyzed, or otherwise presented to the administrator or authorized user as desired. In addition, IAM system 106 could create reports to analyze and correlate data related to the source of the security breach, the type of security breach, any behavioral patterns associated with the security breach, the possibility of future attacks, sources of attacks, or types of attacks on network 102. It should be understood that many other reports, such as individual network device activities, could also be generated according to the present disclosure.

In one example, IAM system 106 could compare collected or stored information from IAM database 108 with predefined rules associated with the network security zone. If information collected is not beyond the network security zones and meets the predefined rules, IAM system 106 continues to collect information about the network activity of the connected network device. On the other hand, if the information collected by IAM system 106 does not meet the predefined rules or is beyond the bounds of the defined network security zone, then IAM system 106 could generate an alert and send the alert to a network administrator, authorized user, monitoring console, alert database, other suitable entity, or any combination thereof.

In another example, suppose an authorized user from a human resources department attempts to access a secured database having confidential employee information. Because the authorized user, in this case, is allowed to access the database, IAM system 106 could collect the data from the user, compare the data against the predefined rules defined in a network security zone (as described herein in conjunction with the description accompanying FIG. 2), verify that the user is authorized to access the database, and allow the user to access the database. It should be understood that IAM system 106 could include various other operations and steps in conjunction with those described above or in lieu of such steps in accordance with the present disclosure.

Figure 2:
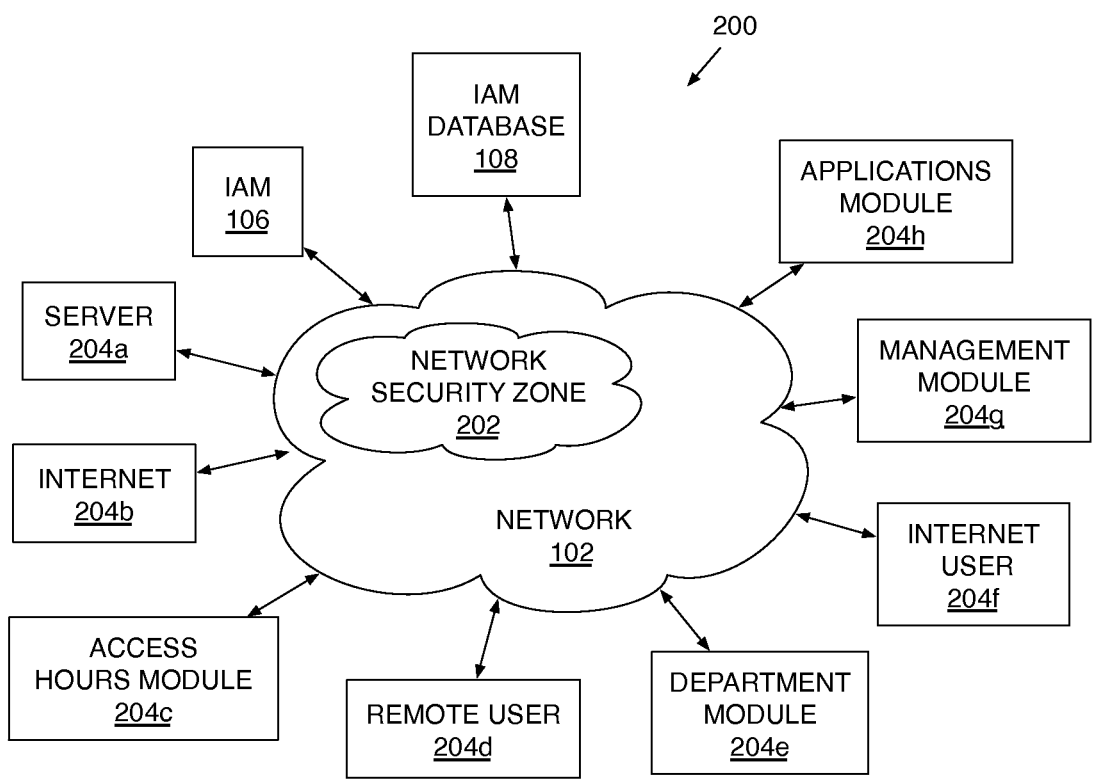
FIG. 2 is an exemplary illustration of a network having a network security zone associated with a network of resource objects according to one embodiment of the present disclosure.

In still another example, suppose an unauthorized user from outside of network 100 were to attempt access to the same secured database having confidential employee information, IAM system 106 could collect data from the unauthorized user, compare the data against the predefined rules provided by a network security zone (as described herein in conjunction with the description accompanying FIG. 2), verify that the user is not authorized to access the database, restrict the user from accessing the database, and send an alert to the appropriate authorities. It should be understood that IAM system 106 could include various other operations and steps in conjunction with those described above or in lieu of such steps in accordance with the present disclosure.

FIG. 2 is an exemplary illustration of a network system 200 according to one embodiment of the present disclosure. Network system 200 could include any communication system either hardwired, wireless, or networked between two or more communicable components. It should be understood that network system 200 shown in FIG. 2 is for illustrative purposes only and that any other suitable system or subsystem could be used in conjunction with or in lieu of network system 200 in accordance with the present disclosure.

Network system 200 could include a user-defined access map, virtual communication map, relationship correlator, network access zone, or network security zone 202. Network security zone 202 could provide access to, communicate with, define, or otherwise be connected to one or more network devices or network resource objects. Network security zone 202 shown in FIG. 2 is for illustrative purposes only.

It should be understood that any suitable number of network security zones 202 could be associated with network system 200 or multiple enterprise systems. Although network security zones 202 are generally described as a user-defined entities, it should be understood that network system 200 could also include any other suitable system or subsystem could be used in conjunction with or in lieu of network security zone 202 that detects security violations by comparing newly collected information and generating alerts when any new information violates a previously collected information pattern.

Network resource objects shown in FIG. 2 could include any suitable object including, for example, network resource objects 104 shown and described in conjunction with FIG. 1. As an example, network resource objects could include access to server 204*a*, global Internet 204*b*, access hours module 204*c*, remote user 204*d*, department module 204*e*, Internet user 204*f*, management module 204*g*, applications module 204*h*, and any combination thereof, as generally shown in FIG. 2. Server 204*a*, global Internet 204*b*, access hours module 204*c*, remote user 204*d*, department module 204*e*, Internet user 204*f*, management module 204*g*, and applications module 204*h* are collectively referred to as network resource objects 204.

Network security zone 202 could provide relationship definitions, security rules, communication boundaries, other suitable rule sets, or any combination thereof between any desired combinations of network resource objects 204. For example, network security zone 202 could include relationship definitions for each of network resource objects 204. The relationship definitions could include security measures, access restrictions, or communication relationships based on a particular resource object's name, category of resource object, Internet protocol (IP) address, IP port number, protocols for use on a particular port, priority level, status, source, destination, other suitable information, or any combination thereof. It should be understood that the relationship definitions used by network security zone 202 could be configured, altered, prioritized, amended, shared, or otherwise customized as desired.

Network security zone 202 provides secured boundaries for each of network resource objects 204 associated with network security zone 202. As an example, one of network resource objects 204 could not access or otherwise communicate with another one of network resource objects 204 without having the requisite access relationship defined within network security zone 202. In other words, network resource objects 204 could be selectively accessible according to security measures, desired connectivity requirements, or other desired settings placed on or otherwise imposed by network security zone 202, one of network resource objects 204, or any combination thereof.

Network security zone 202 is generally a collection of defined network resource objects 204 against which the IAM system 106 compares collected information stored in IAM database 108. IAM system 106 could collect information about the network activity of each of network resource objects 204 associated with network system 200. IAM system 106 could also collect information about one or more network resource objects 204. Information collected by IAM system 106 could be stored in, organized in, accessed from, or otherwise manipulated from IAM database 108 or other suitable databases, memories, storage units, other suitable objects, or any combination thereof.

IAM system 106 could detect any security policy violations and report such violations to, for example, an alert database or real-time monitoring console. For example, in one embodiment, IAM system 106 could include a monitoring console that allows a user to identify alerts generated by IAM system 106 for specific purposes. For example, one monitoring console could be used to assess the overall security posture of the network, while another could be used to specifically monitor for intrusion detection. Network security administrators could thus identify users requiring access to specified servers and applications, and also detect unauthorized access attempts in an easy and cost efficient manner without requiring the use of host agents or deploying obtrusive centralized authentication appliances as described in detail later herein.

Figure 3A:
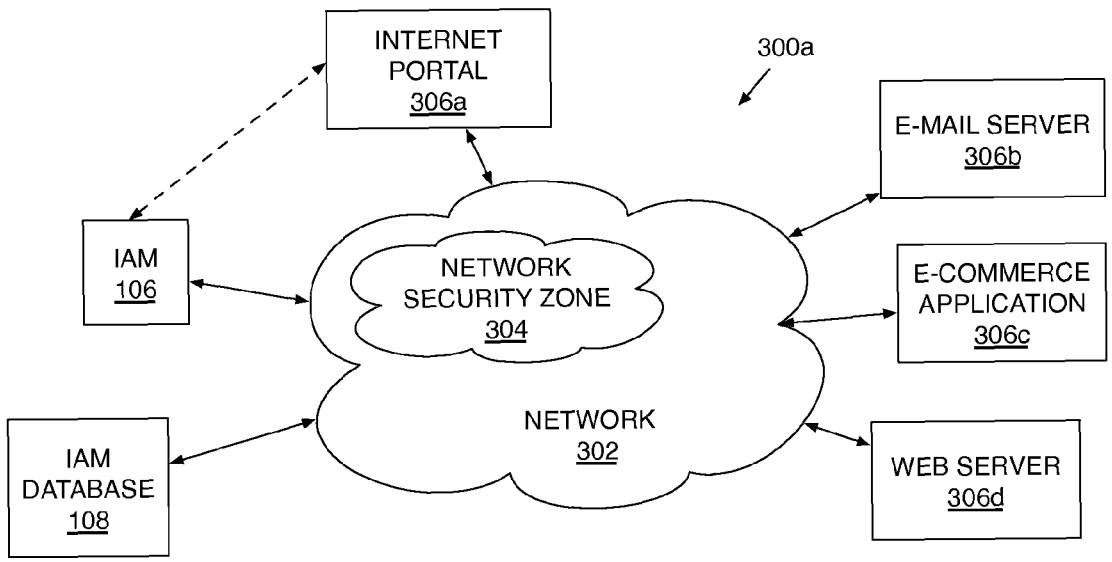
FIGS. 3A and 3B are exemplary illustrations of a network security zone implementing the IAM system shown in FIG. 1 according to one embodiment of the present disclosure.
Figure 3B:
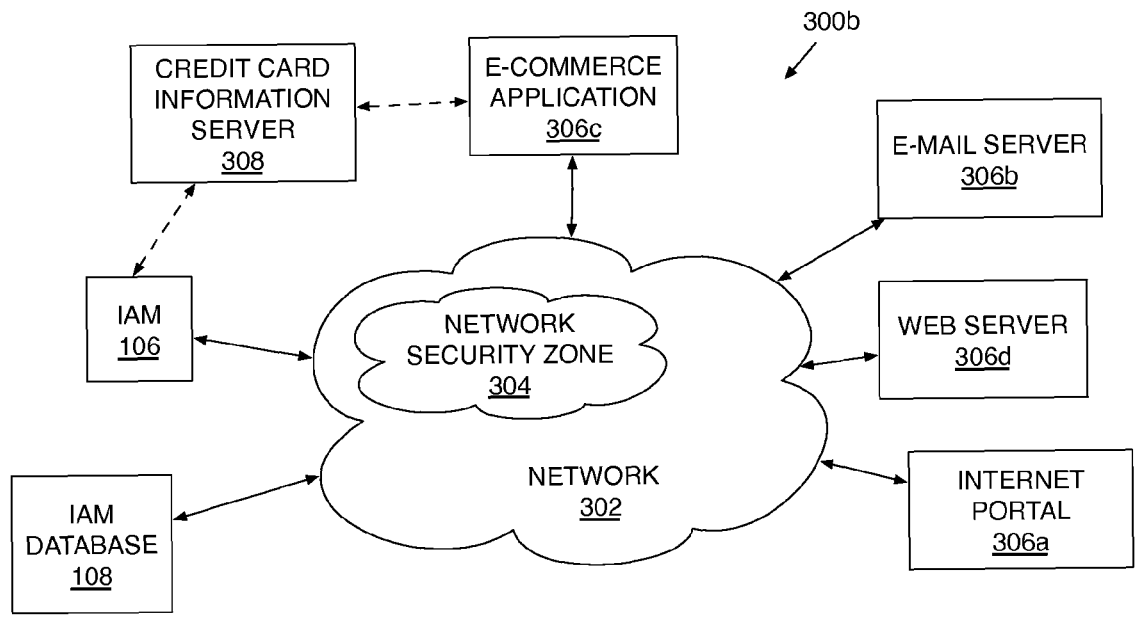

FIGS. 3A and 3B are exemplary illustrations of methods 300a and 300b (collectively referred to herein as methods 300) of network 302 using IAM system 106 associated with a user-defined network security zone 304 according to one embodiment of the present disclosure. It should be understood that methods 300 shown in FIGS. 3A and 3B are for illustrative purposes only and that any other suitable method or sub-method could be used in conjunction with or in lieu of methods 300 in accordance with the present disclosure. In addition, it should also be understood that network security zone 304 shown in FIGS. 3A and 3B are for illustrative purposes only and that any other suitable network security zone 304 could also be used in conjunction with or in lieu of network security zone 304 in accordance with the present disclosure.

Methods 300 generally provide methods of securing boundaries for network resource objects 306a, 306b, 306c, and 306d (collectively referred to herein as network resource objects 306) defined within network security zone 304 and managed by IAM system 106. Network resource objects 306 could include, for example, any network resource objects 104 shown and described in conjunction with FIG. 1, network resource objects 204 shown and described in conjunction with FIG. 2, or include other suitable network related entities. In the examples shown in FIGS. 3A and 3B, network resource objects 306 could include global Internet portal 306a, external e-mail server 306b, e-commerce application 306c, and web server 306d.

In one embodiment, depending on the level of security desired, an administrator, other authorized user, or other entity could customize or otherwise create network security zone 304 to selectively choose a security clearance or priority level for each of network resource objects 306 in the network using IAM system 106. For example, IAM system 106 could manage connectivity, security, and accessibility between two or more network resource objects 306 associated with network security zone 304, as shown in the example illustrated in FIG. 3A, or between each of network resource objects 306 and any authorized out-of-network devices or users, such as out-of-network user 308, as shown in the example illustrated in FIG. 3B. It should be understood that IAM system 106 could include various other relationships, authorizations, permissions, security operations, or other suitable operations in conjunction with those described above or in lieu of such operations in accordance with the present disclosure.

In the example shown in FIG. 3A, suppose an authorized network device, network resource object, or user associated with network resource object 306a (an Internet portal) attempts to access network resource object 306c (an e-commerce application). IAM system 106 would collect information from network resource object 306a such as, for example, an IP address, user name, priority level, security clearance, etc., and compare that information with the defined rules stored in IAM database 108. IAM system 106 generally uses such collected information to identify the object attempting to access network resource object 306 and then manages the access attempt depending on such defined rules. For example, if the access attempt originates from an authorized user or device, IAM system 106 could allow access, record access information, and correlate such information into access reports. If the access attempt is an unauthorized attempt, IAM system 106 could disallow access, record any access attempt or related information, provide an alert to an authorized entity, and correlate such information into access attempt or alert reports.

In the example shown in FIG. 3B, suppose an unauthorized, out-of-network, or foreign network device such as, for example, credit card information server 308 attempts to access one of network resource objects 306c (e-commerce application) defined in network security zone 304, then any network information related to or generated by this attempted transaction is collected by IAM system 106 and compared to the rules defined for that network security zone 304. In this case, because the transaction is not allowed, IAM system 106 could inform or otherwise alert an authorized user, alert database, authorized user, monitoring console, terminal, other suitable database or entity, or any combination thereof of the attempted transaction from out-of-network credit card information server 308. Accordingly, IAM system 106 could be configured to detect the identity and access related information from entities outside of the user-defined boundaries of the network security zone 304 or from network 300 and generate an alert to the appropriate authorities or entity.

Accordingly, in one embodiment, the present disclosure provides systems and methods of identity and access management that could partition network resource objects into a series of zones defined by secure relationships. Relationships between the elements of the network resource objects could generally be defined within a series of zones. The systems and methods could then generate alerts for unauthorized access attempts or intrusion from a foreign device into such zones based on the defined relationships. Within a zone of the identity and access management system, the resource object could be defined by detailed information including, for example, defined users, groups of users, systems, applications, ports, protocols, and time intervals. In one embodiment, an alert could be generated for attempts to communicate with other resource objects that violate the defined relationships of these network resource objects according to their pre-defined elements.

Figure 4:
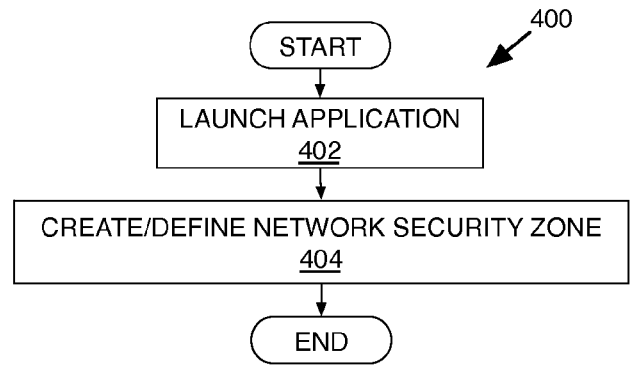
FIG. 4 is an exemplary flow diagram illustrating a method of initializing and defining allowable network activity by implementing the IAM system shown in FIG. 1 according to one embodiment of the present disclosure.

FIG. 4 is an exemplary flow diagram illustrating method 400 of initializing or otherwise defining a secure network using an identity and access management system according to one embodiment of the present disclosure. It should be understood that method 400 shown in FIG. 4 is for illustrative purposes only and that any other suitable method or sub-method could be used in conjunction with or in lieu of method 400 in accordance with the present disclosure.

Method 400 could initially begin by having an administrator launch an IAM system application in step 402. As one example, the IAM system application launched in step 402 could include any suitable software application to initialize, set-up, modify, control, or otherwise operate IAM system 106 shown in FIG. 2. It should be understood that IAM system 106 does not require regular initialization procedures as shown in method 400, but that such procedures could be repeated as necessary. IAM system 106 could include a "plug-n-play" module that automatically initializes IAM system 106 and sets up initial security definitions depending on the network associated with IAM system 106. In addition, IAM system 106 could use information from the network behavioral analysis to dynamically restrict access to authorized users when increasing hostility is detected. For example, IAM system 106 could restrict access to authorized users in unrelated areas of the network.

The administrator could create customized network security zones in step 404. As one example, the administrator in step 404, could initialize, set-up, modify, control, define or otherwise create customized rules for, for example, general network activity, access clearance, and priority levels for each network resource object associated with the network. These rules could include defining network security zones, such as network security zone 202 shown in FIG. 2, managing how such rules are implemented by using, for example, IAM system 106, storing initial and compiled data in a database, such as IAM database 108, alerting network administrators, authorized users of the network, storing such alerts in a database such as IAM database 108, and correlating error alerts into reports and providing an analysis of attempted accesses of the network and resources associated with the network.

Figure 5:
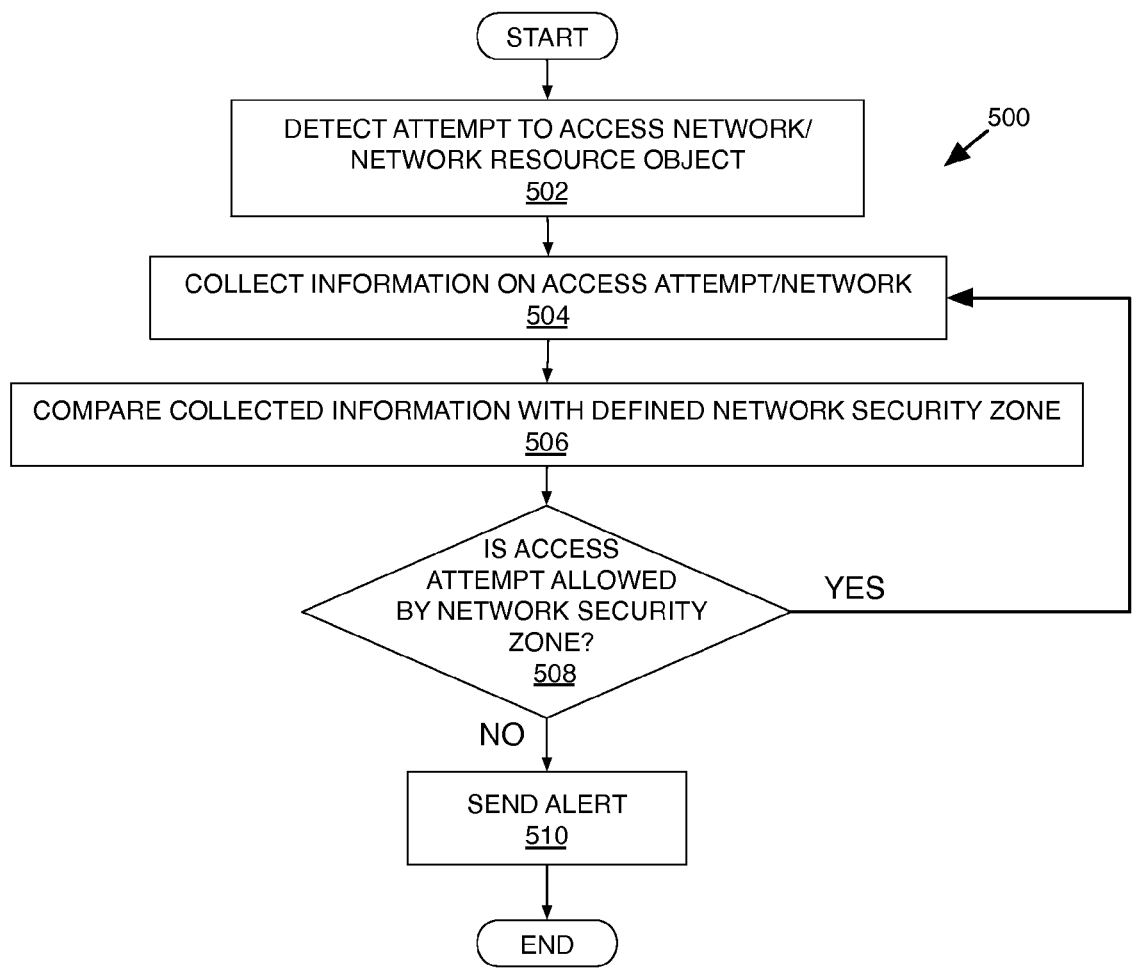
FIG. 5 is an exemplary flow diagram illustrating a method of detecting security violations and generating alerts in the network using the IAM system shown in FIG. 1 according to one embodiment of the present disclosure.

FIG. 5 is an exemplary flow diagram illustrating method 500 of detecting security violations in the network by implementing IAM system 106 shown in FIG. 1 according to one embodiment of the present disclosure. It should be understood that method 500 shown in FIG. 5 is for illustrative purposes only and that any other suitable method or sub-method could be used in conjunction with or in lieu of method 500 in accordance with the present disclosure.

In step 502, IAM system 106 detects a user, device, or other object attempting to access the network, network resource object, any other part of the network, or any combination thereof. IAM system 106, in particular, could collect information on the network device associated with the user attempting to access the network and the activity of that network device in step 504.

In step 506, the collected information is compared to rules that are previously defined and associated with a network security zone such as, for example, network security zone 202 shown in FIG. 2 or network security zone 304 shown in FIGS. 3A and 3B. If the collected information meets the predefined rules established by the network security zone and is allowed by the network security zone, IAM system 106 continues to collect information about the network activity of the connected network device in step 506.

Otherwise, if in step 508, method 500 determines that the collected information is not allowed by the network security zone and is beyond the bounds of the defined network security zone, then IAM system 106 could generate an alert in step 508 and send the alert to a monitoring system, alert database, administrator, authorized user, other suitable person, system, or database in step 510.

Figure 6:
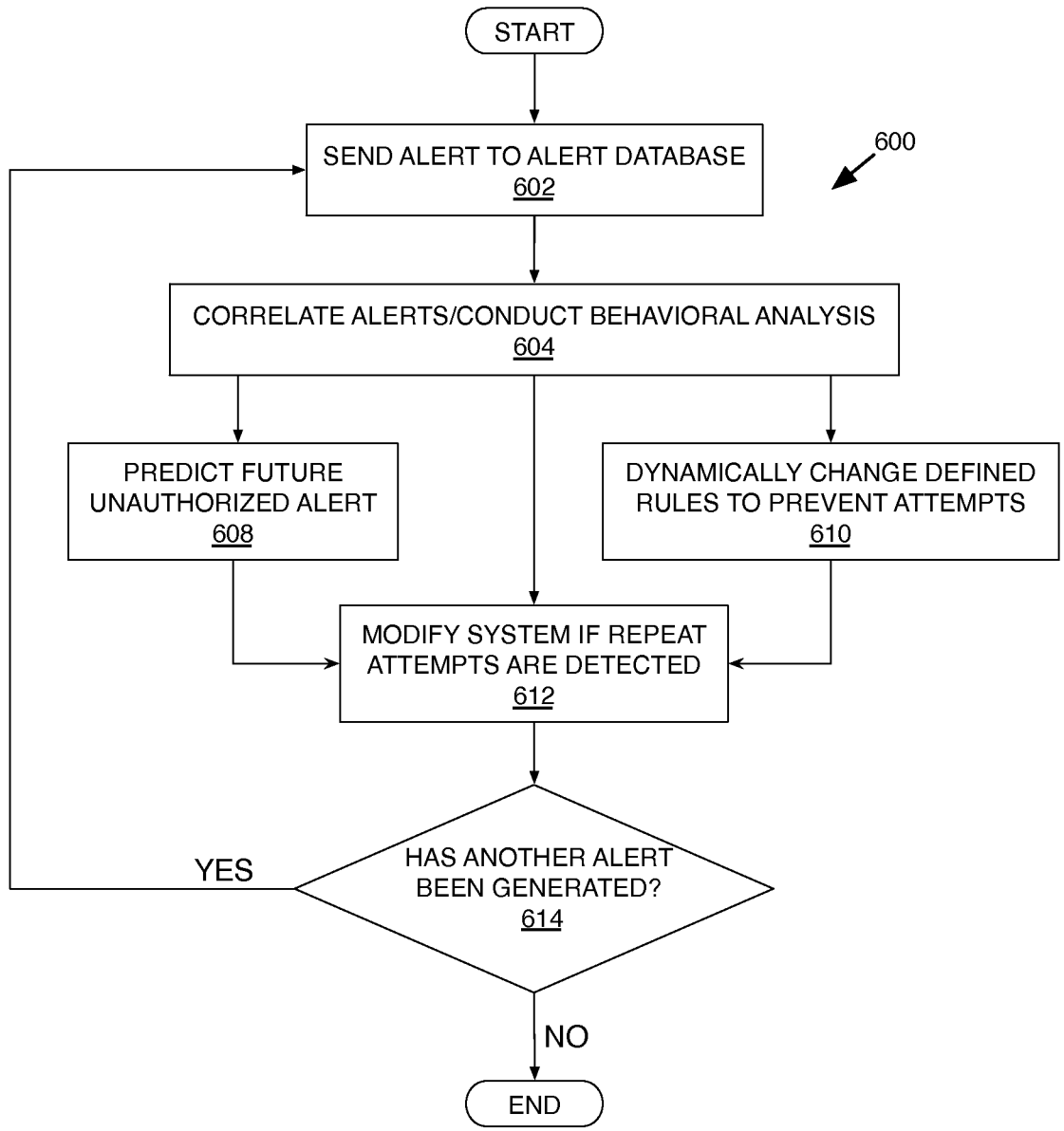
FIG. 6 is an exemplary flow diagram of an alert management system used by the IAM system shown in FIG. 1 according to one embodiment of the present disclosure.

FIG. 6 is an exemplary flow diagram illustrating method 600 of managing alerts by implementing IAM system 106 shown in FIG. 1 according to one embodiment of the present disclosure. It should be understood that method 600 shown in FIG. 6 is for illustrative purposes only and that any other suitable method or sub-method could be used in conjunction with or in lieu of method 600 in accordance with the present disclosure.

Method 600 could continue from step 510 in method 500 shown in FIG. 5 or begin in step 602 by sending an alert to the alert database. In step 604, method 600 could continue by having IAM system 106 correlate the alerts and conduct a behavioral analysis of the collected information.

Depending on the type of or category of collected information, method 600 could predict future unauthorized alerts in step 608 or dynamically change defined rules to prevent future attempts in step 610. Steps 608 and step 610 could be performed together or individually without the performance of the other. In either case, method 600 could continue with step 612. In step 612, method 600 could use IAM system 106 to modify the behavioral analysis if repeat unauthorized attempts are detected. At this point, method 600 could determine if another alert has been generated in step 614. If an alert has been generated, then method 600 could repeat its steps beginning with step 602. Otherwise, method 600 generally ends.

It should be understood that one embodiment of the present disclosure is particularly applicable to electronic information collected on a computer network and could have the capability of the client to mirror network activity, collect and store information about the network activity and devices, and monitor that information to detect security policy violations. It should also be understood that although many of the examples discussed herein are applications of the present disclosure in electronic transactions on a computer network, embodiments of the present disclosure could also be applied to any system where a transaction requires security. For example, embodiments of the present disclosure could be employed in transactions where theft of information occurs on one or more network devices on any communications network, the telephone, mail, facsimile, or in person.

It should also be understood that embodiments of the present disclosure could be used to provide an identity and access management system for network security in various applications such as, for example, e-commerce transactions, identity verification transactions, credit card transactions, and the like. In such applications, embodiments of the present disclosure could provide automatic monitoring of mirrored network activity and detecting of defined security policy violations. Security policy violations could then be reported to a monitoring console or other suitable entity.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
performing, by one or more computer systems:
creating a plurality of network security zones, each having one or more network resource objects, wherein a network security zone includes one or more statically defined access rules configured to allow an authorized user to access the one or more network resource objects, wherein the one or more statically defined access rules includes access rules for determining whether a first network resource object within the network security zone is able to communicate with a second network resource object within the network security zone;
defining secure relationships between each of the plurality of network security zones;
collecting information related to an attempted access to the one or more network resource objects by the authorized user;
comparing the collected information with the one or more statically defined access rules;
predicting a future unauthorized access attempt based on the collected information;
dynamically alter the one or more statically defined access rules to prevent the future unauthorized access attempt;
granting the authorized user access to the one or more network resource objects in response to the collected information meeting the one or more statically defined access rules;
detecting increased hostility in the network security zone; and
in response to detecting the increased hostility, dynamically modifying the one or more statically defined access rules to restrict access of the authorized user to the one or more network resource objects.

2. The method of claim 1, wherein the one or more network resource objects includes a web server, an e-mail server, or an e-commerce application.

3. The method of claim 1, wherein the collected information includes at least one of:
a name of a network resource object, a category of the network resource object, an Internet protocol (IP) address, an IP port number, a protocol, a priority level, status information, source information, or destination information.

4. The method of claim 1, wherein restricting access of the authorized user includes preventing access by the authorized user to the one or more network resource objects.

5. The method of claim 1, further comprising:
performing, by the one or more computer systems:
collecting information related to another attempted access to the one or more network resource objects by the authorized user subsequently to having detected the increased hostility; and
denying the authorized user access to the one or more network resource objects in response to the dynamically modified access rules.

6. The method of claim 5, wherein detecting the increased hostility includes performing a behavioral pattern analysis.

7. The method of claim 5, further comprising:
performing, by the one or more computer systems:
generating an alert in response to having denied the authorized user access to the one or more network resource objects.

8. An identity and access management (IAM) system, comprising:
a computer system configured to:
create a plurality of network security zones, each network security zone corresponding to one or more network resource objects, the network security zone including one or more statically defined access rules associated with one or more authorized users;
defining secure relationships between each of the plurality of network security zones;
receive information related to an attempted access to the network security zone by a user;
compare the received information with the one or more statically defined access rules;
grant the user access to the network security zone in response to the received information meeting the one or more statically defined access rules;
predict a future unauthorized access attempt based on the received information;
dynamically alter the one or more statically defined access rules to prevent the future unauthorized access attempt;
detect an increased hostility in the network security zone;
in response to having detected the increased hostility, dynamically modify the one or more statically defined access rules to deny the user access to the network security zone in response to the dynamically modified access rules; and
record information related to an attempted access to the network security zone by the user subsequently to having detected the increased hostility.

9. The IAM system of claim 8, wherein detecting the increased hostility or vulnerability includes performing a behavioral pattern analysis.

10. A method, comprising:
performing, by one or more computer systems:
identifying a plurality of network security zones, each network security zone corresponding to one or more network resources, the network security zone including one or more access rules, the one or more access rules providing one or more authorized users access to the one or more network resources;
defining secure relationships between each of the plurality of network security zones;
detecting a first attempted access to the one or more network resources by the one or more authorized users;

comparing information related to the first attempted access with the one or more access rules; and allowing the one or more authorized users access to the one or more network resources in response to the information meeting the one or more access rules;

predicting a future unauthorized access attempt based on the information;

dynamically alter the one or more statically defined access rules to prevent the future unauthorized access attempt;

detecting a vulnerability in the network security zone;

in response to having detected the vulnerability, modifying the one or more access rules to deny the one or more authorized users access to the one or more network resources;

detecting a second attempted access to the one or more network resources by the one or more authorized users subsequently to having detected the vulnerability; and comparing information related to the second attempted access with the one or more modified access rules.

11. The method of claim 10, wherein detecting the vulnerability includes performing a behavioral pattern analysis.

12. The method of claim 1, wherein a network resource object comprises a group of devices.

13. The method of claim 12, wherein the group of devices comprises devices having a same priority level assigned to the devices.

14. The method of claim 12, wherein the group of devices comprises devices belonging to a particular department within an enterprise.

15. The method of claim 10, wherein the one or more network resources is a database.

16. The method of claim 10, wherein the one or more network resources is an enterprise application.

17. The method of claim 10, further comprising:

defining a plurality of security levels, assigning the one or more network resources to one of the plurality of security levels; and dynamically adjusting a security level for one or more of the network resources in response to detecting hostility in the one or more of the plurality of network security zones.

* * * * *